(12) United States Patent
Lee (10) Patent No.: US 10,998,850 B2
(45) Date of Patent: May 4, 2021

(54) SOLAR TRACKER HAVING BRAKE FUNCTION

(71) Applicants: SUNGCHANG ENERGY LAB, Chungcheongbuk-do (KR); SUNGCHANG TELECOM CO., LTD, Chungcheongbuk-do (KR)

(72) Inventor: Jae Jin Lee, Chungcheongbuk-do (KR)

(73) Assignees: SUNGCHANG ENERGY LAB, Chungcheongbuk-do (KR); SUNGCHANG TELECOM CO., LTD, Chungcheongbuk-do (KR)

( * ) Notice: Subject to any disclaimer, the term of this patent is extended or adjusted under 35 U.S.C. 154(b) by 17 days.

(21) Appl. No.: 16/328,187

(22) PCT Filed: Aug. 11, 2017

(86) PCT No.: PCT/KR2017/008742
§ 371 (c)(1),
(2) Date: Feb. 25, 2019

(87) PCT Pub. No.: WO2018/043950
PCT Pub. Date: Mar. 8, 2018

(65) Prior Publication Data
US 2019/0199278 A1 Jun. 27, 2019

(30) Foreign Application Priority Data

Aug. 31, 2016 (KR) .................. 10-2016-0111536

(51) Int. Cl.
*H02S 20/32* (2014.01)
*F16H 25/20* (2006.01)
(Continued)

(52) U.S. Cl.
CPC ............. *H02S 20/32* (2014.12); *F16H 25/20* (2013.01); *F24S 30/45* (2018.05); *F24S 50/20* (2018.05);
(Continued)

(58) Field of Classification Search
CPC ............ H02S 20/32; F24S 50/20; F24S 30/45
See application file for complete search history.

(56) References Cited

U.S. PATENT DOCUMENTS 4,082,947 A * 4/1978 Haywood ............. G01S 3/7861
250/203.4
4,146,785 A * 3/1979 Neale .................... G01S 3/7861
250/203.4
(Continued)

FOREIGN PATENT DOCUMENTS

JP 5626598 B2 11/2014
KR 10-2010-0009820 A 1/2010
(Continued)

OTHER PUBLICATIONS

International Search Report from corresponding PCT Application No. PCT/KR2017/008742, dated Nov. 15, 2017.

*Primary Examiner* — Edward J. Schmiedel
(74) *Attorney, Agent, or Firm* — Harness, Dickey & Pierce, P.L.C.

(57) ABSTRACT

A solar tracker having a brake function is disclosed. The solar tracker according to an embodiment of the present invention relates to a technology having a dual position sensing device provided at a part at which altitude adjustment and horizontal rotation of a solar collector plate respectively end, such that a brake is accurately operated for a driving motor, which is respectively in charge of altitude adjustment and horizontal rotation.

5 Claims, 6 Drawing Sheets

(51) Int. Cl.
  *H02P 3/08* (2006.01)
  *F24S 50/20* (2018.01)
  *H02P 7/03* (2016.01)
  *H02S 40/22* (2014.01)
  *H02S 30/00* (2014.01)
  *F24S 30/45* (2018.01)
  *H02P 3/10* (2006.01)
  *F24S 30/00* (2018.01)

(52) U.S. Cl.
  CPC .................. *H02P 3/08* (2013.01); *H02P 3/10* (2013.01); *H02P 7/03* (2016.02); *H02S 30/00* (2013.01); *H02S 40/22* (2014.12); *F24S 2030/11* (2018.05); *F24S 2030/135* (2018.05); *F24S 2030/19* (2018.05); *Y02E 10/52* (2013.01)

(56) References Cited

U.S. PATENT DOCUMENTS

| | | | |
|---|---|---|---|
| 4,936,427 A * | 6/1990 | Ferree | H01R 35/02 |
| | | | 136/245 |
| 2005/0262716 A1 | 12/2005 | Lee | |
| 2009/0114267 A1* | 5/2009 | Thompson | H02S 20/32 |
| | | | 136/246 |
| 2014/0069481 A1* | 3/2014 | Eom | F24S 30/45 |
| | | | 136/246 |

FOREIGN PATENT DOCUMENTS

| KR | 10-2011-0058765 A | 6/2011 |
| KR | 10-1144703 B1 | 5/2012 |
| KR | 10-2014-0072963 A | 6/2014 |
| KR | 10-2016-0095532 A | 8/2016 |

\* cited by examiner

SOLAR TRACKER HAVING BRAKE FUNCTION

CROSS-REFERENCE TO RELATED APPLICATIONS

This application is a national phase application of PCT Application No. PCT/KR2017/008742, filed on Aug. 31, 2016, which claims priority to Korean Patent Application No. 10-2016-0111536 filed on Aug. 31, 2016. The entire disclosures of the applications identified in this paragraph are incorporated herein by references.

FIELD

The present invention relates to a solar tracker, and more particularly, to a technique of allowing a brake for a driving motor to precisely operate at respective times when altitude adjustment and horizontal rotation of a solar photovoltaic panel are finished.

BACKGROUND

Generally, a photovoltaic generator is a generating unit which includes solar cells, a storage battery, and a power converter, condenses solar light using a solar photovoltaic panel including a plurality of solar cells installed therein, and converts light energy into electrical energy. Since a power generation amount of such photovoltaic generator varies according to the number of installed solar cells, it is necessary to generate power as much as necessary where they need such that generation is eligible not only large scale but also small scale so as to be generally used for domestic use and industrial use.

Such photovoltaic generators may be classified into a fixed type and a solar tracking type according to a method of installing a solar photovoltaic panel.

A fixed type solar photovoltaic generator has a structure in which a solar photovoltaic plate is fixed at an angle of receiving a largest amount of sunlight and which is simple, easily installed, and has high durability to be easily maintained and repaired. However, since a deviation in a power generation amount is high according to an incident angle of sunlight, average power generation efficiency is not high.

Meanwhile, such solar tracking type photovoltaic generators may be classified into a single-axis-rotation type generator, which rotates solar photovoltaic panel to track movement of the sun from east to west from sunrise to sunset, and a twin-axis rotation type generator, which rotates a solar cell module to track a change in a meridian altitude of the sun. The single-axis-rotation type generator has a relatively simple driving device structure but has power generation efficiency lower than that of the twin-axis-rotation type generator. In comparison, an incident direction of sunlight is constantly perpendicular to the solar cell module such that the twin-axis-rotation type generator may maximize power generation efficiency.

In the case of such solar tracking type photovoltaic generator, above all, it is necessary to develop a method for collecting solar heat or condensing sunlight by tracking a position of the sun. That is, since the position of the sun continuously varies according to rotation and revolution of the earth, a solar tracker is necessary as a means for collecting heat and condensing light of a larger amount of solar energy per unit time.

The solar tracker includes an altitude adjustment driving portion and a horizontal rotation driving portion which change a position of a solar photovoltaic panel according to a change in position of the sun.

The altitude adjustment driving portion is a device which adjusts an altitude of a solar photovoltaic panel and includes first and second altitude adjustment relays, an altitude adjustment driving motor, which drive forward or backward rotation according to supplied driving power when the first and second altitude adjustment relays are driven to relay, an altitude adjustment rotor having a certain length, combined with the altitude adjustment driving motor, and rotating due to the forward or backward rotation driving of the altitude adjustment driving motor, an altitude adjustment moving tab combined with the altitude adjustment rotor and linearly moving along the altitude adjustment rotor and adjusting an altitude of a solar photovoltaic panel when the altitude adjustment rotor rotates, and first and second altitude contact switches arranged on both ends of the altitude adjustment rotor and sensing whether the altitude adjustment moving tab comes into contact with the solar photovoltaic panel at a time when the both ends of the solar photovoltaic panel stop linear movement. The first and second altitude contact switches transmit a result of sensing whether the altitude adjustment moving tab comes into contact, to an altitude adjustment control processing unit (CPU) which adjusts an altitude of the solar photovoltaic panel. Here, the altitude adjustment CPU controls operations of the first and second altitude adjustment relays according to the result of sensing whether the altitude adjustment moving tab comes into contact. Accordingly, when the altitude adjustment moving tab comes into contact at the time at which the both ends of the altitude adjustment rotor stop linear movement, the operations of the first and second altitude adjustment relays are stopped to prevent the altitude adjustment moving tab from linearly moving along the altitude adjustment rotor any more such that the solar tracker may be prevented from being mechanically damaged.

The horizontal rotation driving portion is a device which adjusts horizontal rotation of the solar photovoltaic panel and includes first and second horizontal relays, a horizontal driving motor, which drive forward or backward rotation according to supplied driving power when the first and second horizontal relays are driven to relay, a horizontal driving rotor having a certain length, combined with the horizontal driving motor, and rotating due to the forward or backward rotation driving of the horizontal driving motor, a horizontal moving tab combined with the horizontal rotor and linearly moving along the horizontal rotor and horizontally rotating the solar photovoltaic panel when the horizontal rotor rotates, and first and second horizontal contact switches arranged on both ends of the horizontal rotor and sensing whether the horizontal moving tab comes into contact with the solar photovoltaic panel at a time when the both ends of the solar photovoltaic panel stop linear movement. The first and second horizontal contact switches transmit the result of sensing whether the horizontal moving tab comes into contact, to a horizontal rotation CPU which horizontally rotates the solar photovoltaic panel. Here, the horizontal rotation CPU controls operations of the first and second horizontal relays according to the result of sensing whether the horizontal moving tab comes into contact. Accordingly, when the horizontal moving tab comes into contact at the time at which the both ends of the horizontal rotor stop linear movement, the operations of the first and second horizontal relays are stopped to prevent the horizontal moving tab from linearly moving along the horizontal rotor any more such that the solar tracker may be prevented from being mechanically damaged.

However, when an error occurs in a control program of the altitude adjustment CPU or a failure occurs in the first and second altitude contact switches, since sensing of whether the altitude adjustment moving tab comes into contact is not normally performed such that the altitude adjustment moving tab keeps moving after the both ends of the altitude adjustment rotor stop linear movement, a mechanical damage to the solar tracker may occur.

Likewise, when an error occurs in a control program of the horizontal rotation CPU or a failure occurs in the first and second horizontal contact switches, since sensing of whether the horizontal moving tab comes into contact is not normally performed such that the horizontal moving tab keeps moving after the both ends of the horizontal rotor stop linear movement, a mechanical damage to the solar tracker may occur.

As a cited document related to the present invention, Korean Patent Registration No. 10-1144703 (registered on May 3, 2012) is disclosed.

SUMMARY

Technical Problem

The present invention is directed to providing a solar tracker having a brake function in which, when an error occurs in a control program of an altitude adjustment control processing unit (CPU) or a failure occurs in first and second altitude adjustment contact switches, it is possible to prevent a mechanical damage to the solar tracker, which may occur because sensing is not normally performed such that the altitude adjustment moving tab keeps moving after a time when an altitude adjustment moving tab comes into contact with both ends of an altitude adjustment rotor.

The present invention is also directed to a solar tracker having a brake function in which when an error occurs in a control program of a horizontal rotation CPU or a failure occurs in first and second horizontal contact switches, it is possible to prevent a mechanical damage to the solar tracker, which may occur because sensing is not normally performed such that the horizontal moving tab keeps moving after a time when a horizontal moving tab comes into contact with both ends of a horizontal rotor.

It should be noted that objects of the present invention are not limited to the above-described objects, and other unstated objects of the present invention will be apparent to those skilled in the art from the following descriptions.

Technical Solution

One aspect of the present invention provides a solar tracker having a brake function. The solar tracker includes a horizontal rotation portion which includes a horizontal driving motor and a horizontal limit control and position sensing circuit including first and second horizontal cut-off switches sensing whether a horizontal moving tab horizontally rotating a solar photovoltaic panel comes into contact therewith and horizontally rotates the solar photovoltaic panel, an altitude adjustment portion which includes an altitude adjustment driving motor and an altitude adjustment limit control and position sensing circuit including first and second altitude adjustment cut-off switches sensing whether an altitude adjustment moving tab adjusting an altitude of the solar photovoltaic panel comes into contact therewith and adjusts the altitude of the solar photovoltaic panel, a horizontal rotation driving portion which supplies driving power to the horizontal driving motor, an altitude adjustment driving portion which supplies driving power to the altitude adjustment driving motor, and a controller which removes driving power to the horizontal driving motor when contact of the horizontal moving tab is sensed at the first and second horizontal contact switches and removes driving power to the altitude adjustment driving motor when contact of the altitude adjustment moving tab is sensed at the first and second altitude adjustment contact switches.

The horizontal rotation portion may include a horizontal actuator including a horizontal rotor having a certain length, coupled with the horizontal driving motor, and rotating due to forward or backward rotational driving of the horizontal driving motor and the horizontal moving tab, include first and second horizontal contact switches arranged on both ends of the horizontal rotor and sensing whether the horizontal moving tab comes into contact with both ends of the horizontal rotor. Also, the first and second horizontal cut-off switches may be located at ends farther than the both ends of the first and second horizontal contact switches and sense whether the horizontal moving tab comes into contact therewith.

The altitude adjustment portion may include an altitude adjustment actuator including an altitude adjustment rotor having a certain length, coupled with the altitude adjustment driving motor, and rotating due to forward or backward rotational driving of the altitude adjustment driving motor and the altitude adjustment moving tab, include first and second altitude adjustment contact switches arranged on both ends of the altitude adjustment rotor and sensing whether the altitude adjustment moving tab comes into contact with both ends of the altitude adjustment rotor. Also, the first and second altitude adjustment cut-off switches may be located at ends farther than both ends of the first and second altitude adjustment contact switches and sense whether the altitude adjustment moving tab comes into contact therewith.

The horizontal rotation driving portion may include a horizontal brake diode used for a brake preventing inertial rotation of the horizontal driving motor by matching voltage levels of both ends of the horizontal driving motor with each other when the horizontal moving tab is sensed at the first and second horizontal cut-off switches.

The altitude adjustment rotation driving portion may include an altitude adjustment brake diode used for a brake preventing inertial rotation of the altitude adjustment driving motor by matching voltage levels of both ends of the altitude adjustment driving motor with each other when the altitude adjustment moving tab is sensed at the first and second altitude adjustment cut-off switches.

Advantageous Effects

According to a solar tracker having a brake function according to an embodiment of the present invention, when an error occurs in a control program of an altitude adjustment control processing unit (CPU) or a failure occurs in first and second altitude adjustment contact switches, it is possible to prevent a mechanical damage to the solar tracker, which may occur because sensing is not normally performed such that the altitude adjustment moving tab keeps moving after a time when the altitude adjustment moving tab comes into contact with both ends of an altitude adjustment rotor.

Also, when an error occurs in a control program of a horizontal rotation CPU or a failure occurs in first and second horizontal contact switches, it is possible to prevent a mechanical damage to the solar tracker, which may occur because sensing is not normally performed such that the horizontal moving tab keeps moving after a time when the horizontal moving tab comes into contact with the both ends of a horizontal rotor.

DETAILED DESCRIPTION

Hereinafter, an exemplary embodiment of the present invention will be described in detail with reference to the attached drawings.

Figure 1:
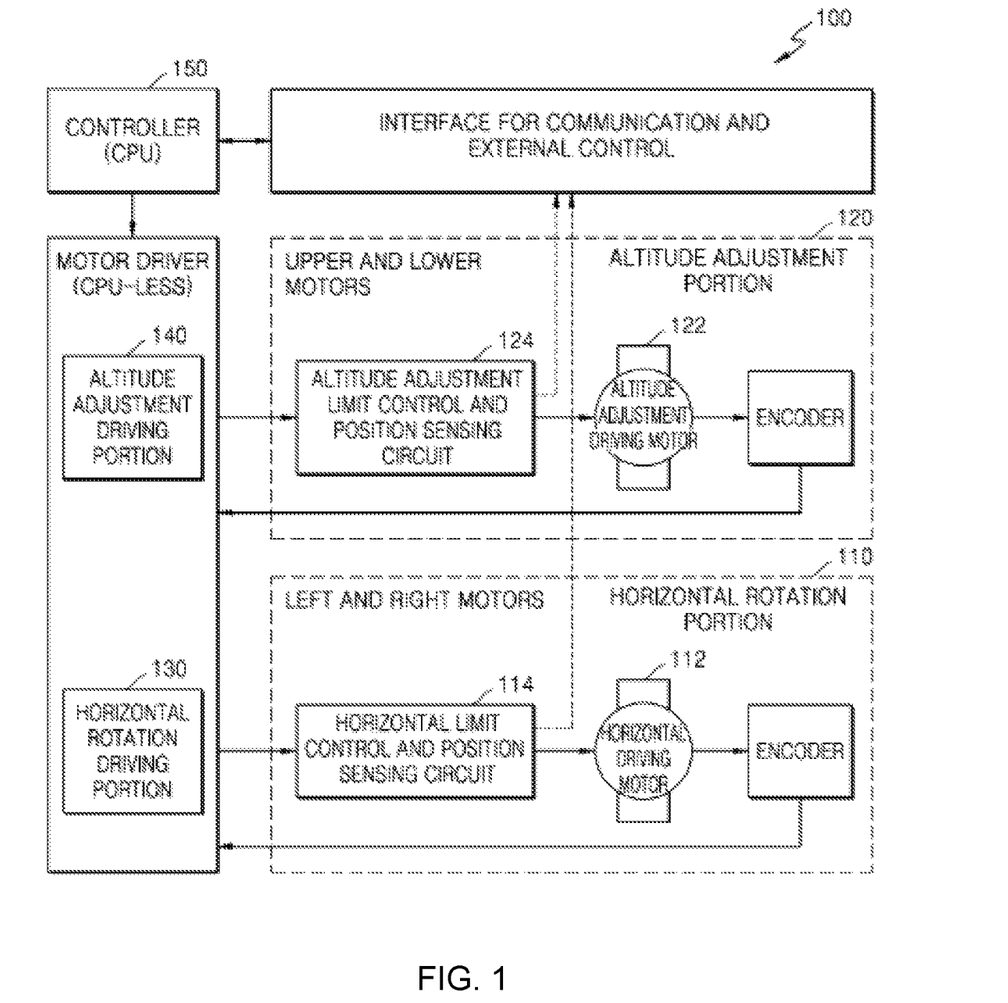
FIG. 1 is a view illustrating components of a solar tracker having a brake function according to an embodiment of the present invention.

FIG. 1 is a view illustrating components of a solar tracker having a brake function according to an embodiment of the present invention.

A solar tracker 100 having a brake function according to an embodiment of the present invention includes a horizontal rotation portion 110 which includes a horizontal driving motor 112, a horizontal actuator including a horizontal rotor having a certain length, coupled with the horizontal rotation motor 112, and rotating due to forward and backward driving of the horizontal driving motor 112 and a horizontal moving tab coupled with the horizontal rotor and linearly moving along the horizontal rotor and horizontally rotating a solar photovoltaic panel when the horizontal rotor rotates, first and second horizontal contact switches arranged on both ends of the horizontal rotor and sensing whether the horizontal moving tab comes into contact with the both ends of the horizontal rotor, and a horizontal limit control and position sensing circuit including first and second horizontal cut-off switches located farther than the both ends of the first and second horizontal contact switches and sensing whether the horizontal moving tab comes into contact therewith, and horizontally rotates the solar photovoltaic panel;

an altitude adjustment portion 120 which includes an altitude adjustment driving motor 122, an altitude adjustment actuator including an altitude adjustment rotor having a certain length, coupled with the altitude adjustment driving motor 122, and rotating due to forward and backward driving of the altitude adjustment driving motor 122 and an altitude adjustment moving tab coupled with the altitude adjustment rotor and linearly moving along the altitude adjustment rotor and adjusting an altitude of the solar photovoltaic panel when the altitude adjustment rotor rotates, first and second altitude adjustment contact switches arranged on both ends of the altitude adjustment rotor and sensing whether the altitude adjustment moving tab comes into contact with the both ends of the altitude adjustment rotor, and an altitude adjustment limit control and position sensing circuit 124 including first and second altitude adjustment cut-off switches located farther than the both ends of the first and second altitude adjustment contact switches and sensing whether the altitude adjustment moving tab comes into contact therewith, and adjusts an altitude of the solar photovoltaic panel;

a horizontal rotation driving portion 130 which supplies driving power to the horizontal driving motor 112 and includes a horizontal brake diode used for a brake preventing inertial rotation of the horizontal driving motor by matching voltage levels of both ends of the horizontal driving motor 112 with each other when the horizontal moving tab is sensed at the first and second horizontal cut-off switches;

an altitude adjustment driving portion 140 which supplies driving power to the altitude adjustment driving motor 122 and includes an altitude adjustment brake diode used for a brake preventing inertial rotation of the altitude adjustment driving motor by matching voltage levels of both ends of the altitude adjustment driving motor 122 with each other when the altitude adjustment moving tab is sensed at the first and second altitude adjustment cut-off switches; and a controller 150 which removes driving power to the horizontal driving motor 112 when contact of the horizontal moving tab is sensed at the first and second horizontal contact switches and removes driving power to the altitude adjustment driving motor 122 when contact of the altitude adjustment moving tab is sensed at the first and second altitude adjustment contact switches.

The solar tracker 100 having the brake function according to the embodiment of the present invention performs CPU-less control and CPU control.

Figure 2:
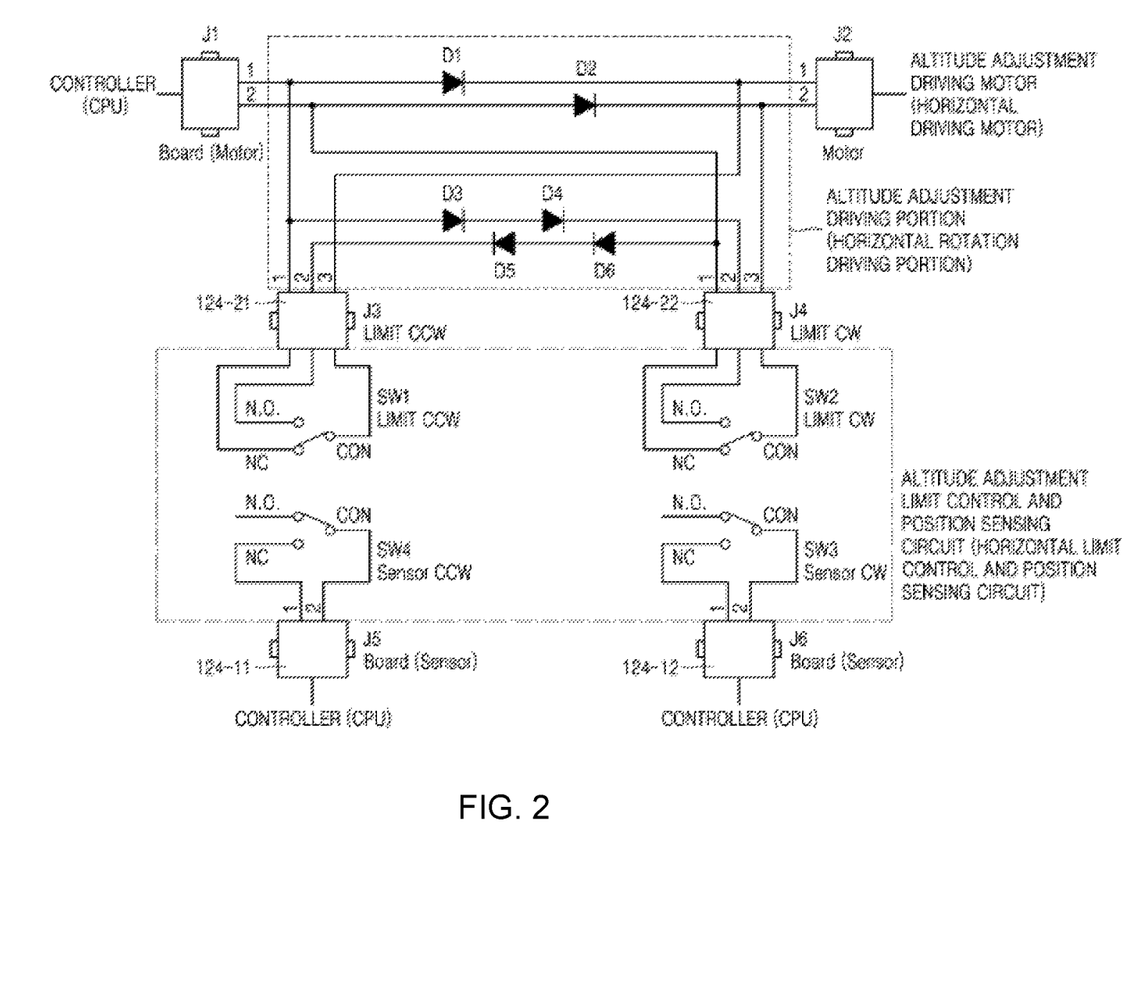
FIG. 2 is a view illustrating a relation between an altitude adjustment driving portion (or horizontal rotation driving portion) and an altitude adjustment limit control and position sensing circuit (or horizontal limit control and position sensing circuit).

1. CPU-Less Control
   Controlling a direct current (DC) motor through hardware logic instead of CPU control
   Using a limit switch as a part of a motor driving circuit to be utilized as a switch capable of unconditionally stopping
2. CPU Control
   Recognizing a limit switch as a sensor to stop and initialize a position FIG. 2 is a view illustrating a relation between the altitude adjustment driving portion (or horizontal rotation driving portion) and the altitude adjustment limit control and position sensing circuit (or horizontal limit control and position sensing circuit).

D3, D4, D5, and D6 are diodes for a brake and used for a brake which prevents inertial rotation of a motor by matching voltage levels of both ends of the motor with each other when a limit switch operates.

Figure 3:
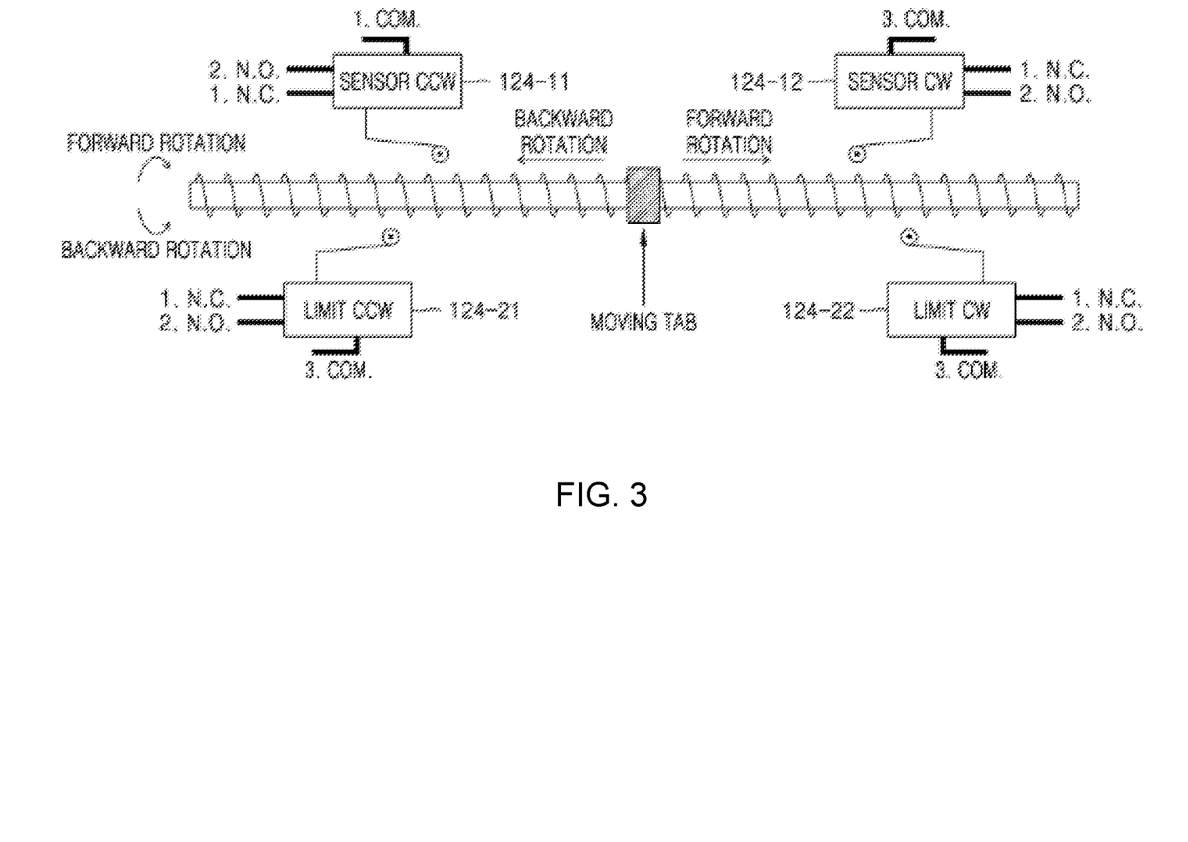
FIG. 3 is a view illustrating detailed components of the altitude adjustment limit control and position sensing circuit (or horizontal limit control and position sensing circuit).

FIG. 3 is a view illustrating detailed components of the altitude adjustment limit control and position sensing circuit (or horizontal limit control and position sensing circuit).

1. A motor driver drives a motor.
2. A rotating shaft of the motor rotates and a moving tab moves forward.
3. The moving tab operates sensors 124-11 and 124-12 in a forward direction, and CPU recognizes and controls the same as a start point and an end point.
4. When the moving tab passes the sensors 124-11 and 124-12 and operates due to an error in CPU control, the moving tab is physically stopped when the moving tab comes into contact with ends of limit switches 124-21 and 124-22.

Figure 4:
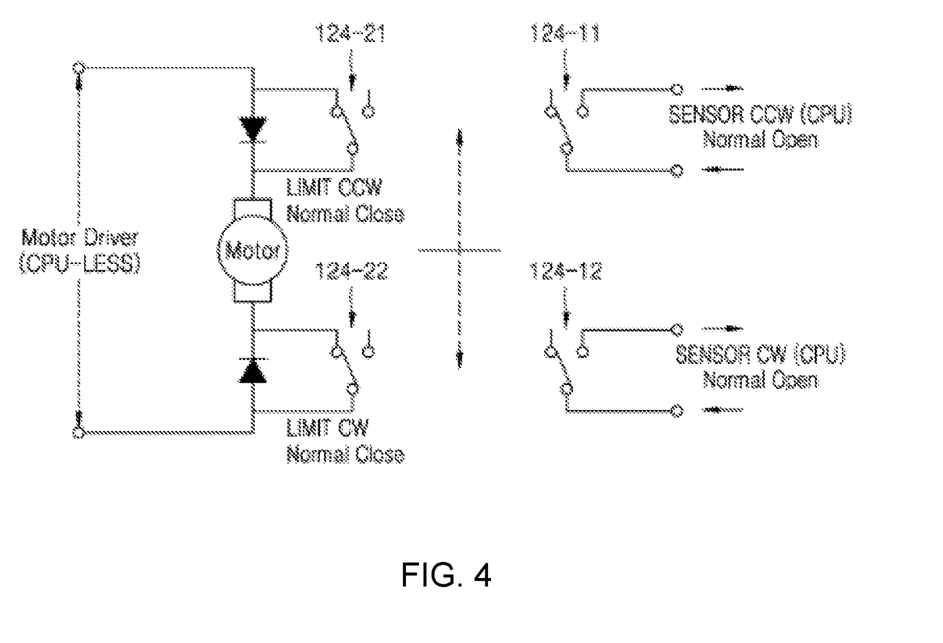
FIGS. 4 and 5 are views illustrating operations of the altitude adjustment limit control and position sensing circuit (or horizontal limit control and position sensing circuit).
Figure 5:
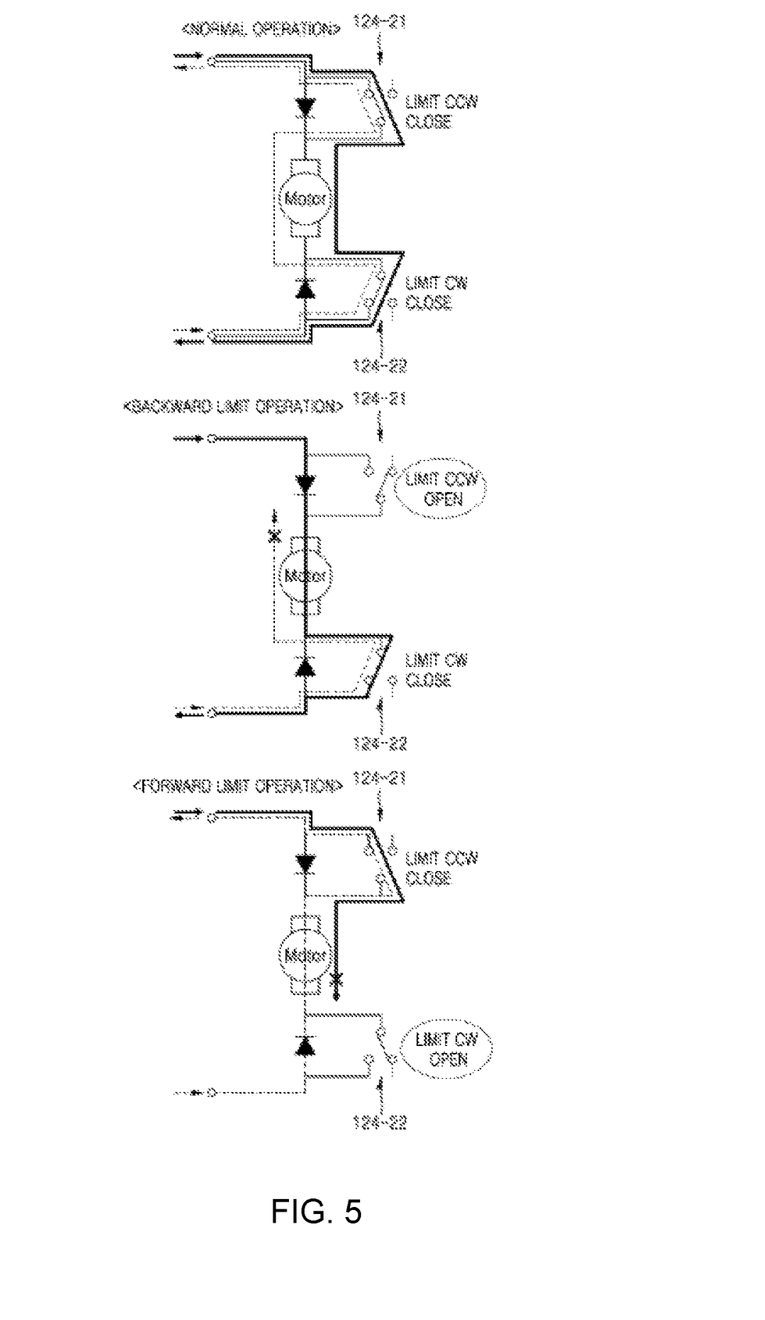

FIGS. 4 and 5 are views illustrating operations of the altitude adjustment limit control and position sensing circuit (or horizontal limit control and position sensing circuit).

1. In a normal operation, the motor rotates bidirectionally while the limit switches 124-21 and 124-22 are closed.

2. When the motor rotates backward to operate a reverse limit switch 124-21, the switch changes to an open state and a current is cut off by a diode such that rotation of the motor is stopped.

3. When the motor is rotated forward while the reverse limit switch 124-21 is opened, the diode of the reverse limit switch 124-21 is operated as forward bias and the motor is normally rotatable.

4. When the motor rotates forward, a forward limit switch 124-22 operates in the same structure in which the reverse limit switch 124-21 operates.

Figure 6:
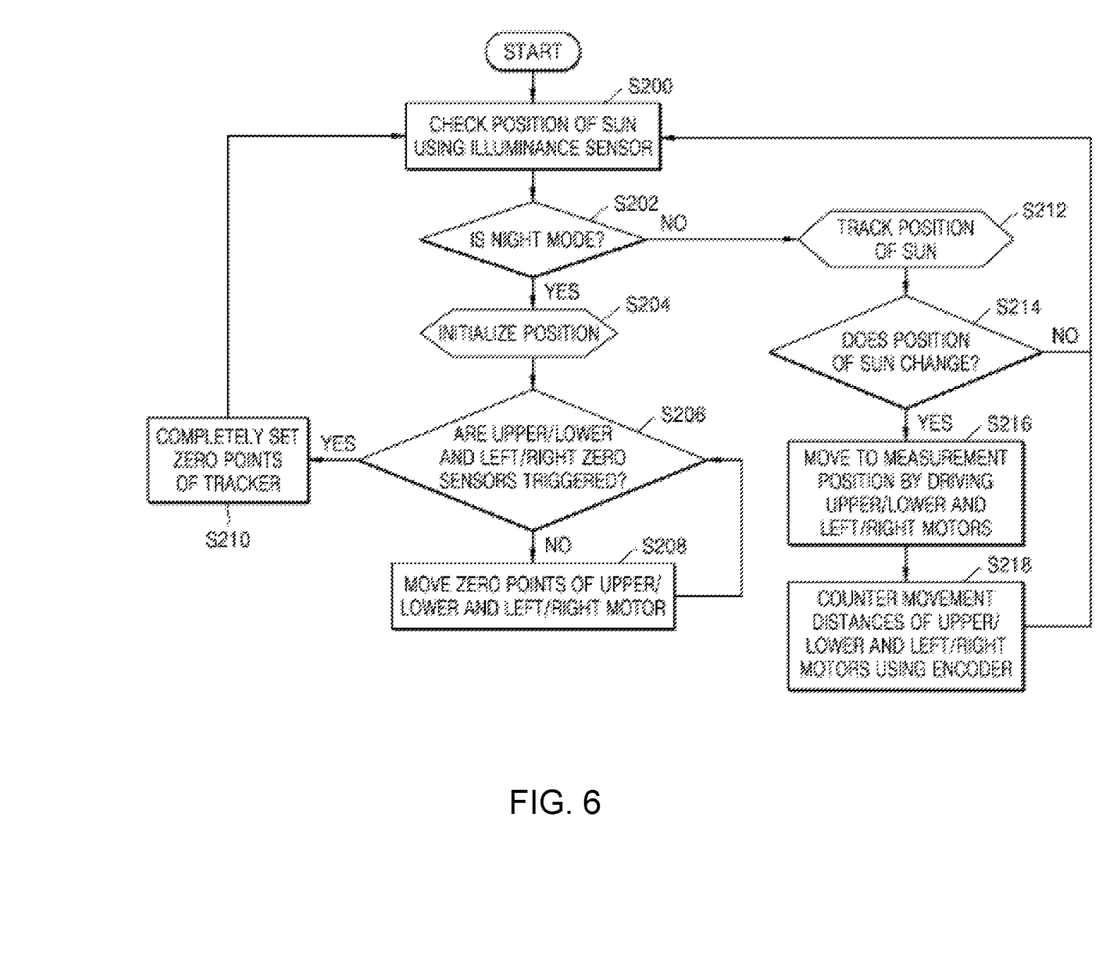
FIG. 6 is a flowchart illustrating operations of the solar tracker having the brake function.

FIG. 6 is a flowchart illustrating operations of the solar tracker having the brake function.

Referring to FIG. 6, a position of the sun is checked by an illuminance sensor (S200). Afterwards, whether it is a night mode or not is determined (S202), and then it is a night mode, a position of the solar tracker is initialized (S204). Afterwards, whether upper/lower and left/right zero sensors of the solar tracker are triggered is determined (S206). When the upper/lower and left/right zero sensors of the solar tracker are not triggered, zero points of upper/lower and left/right motors are moved (S208), and then whether upper/lower and left/right zero sensors of the solar tracker are triggered is continuously determined. However, when the upper/lower and left/right zero sensors of the solar tracker are triggered, a zero point of the solar tracker is completely set (S210) and then a process of returning to an initial state and checking the position of the sun using the illuminance sensor is repeated.

Meanwhile, whether it is the night mode is determined and then it is not the night mode, the position of the sun is tracked (S212). Afterwards, whether the position of the sun changes is determined (S214). When the position of the sun changes, the upper/lower and left/right motors are driven to move to a measurement position (S216). Afterwards, movement distances of the upper/lower and left/right motors are counted using an encoder (S218) and the initial stage is performed. However, whether the position of the sun changes is determined and when the position of the sun does not change, the process of returning to the initial stage and checking the position of the sun using the illuminance is repeated.

The exemplary embodiments of the present invention have been described above. It is understood by one of ordinary skill in the art that modifications may be made without departing from the scope of the present invention. Therefore, the described embodiments should be considered in a descriptive point of view not in a limitative one. Accordingly, the scope of the present invention is not limited to the above-described embodiments and should be interpreted as including the content stated in the claims and a variety of embodiments within the equivalent scope thereof.

INDUSTRIAL APPLICABILITY

The present invention is a technique related to a solar tracker.

What is claimed is:

1. A solar tracker having a brake function, comprising:
a horizontal rotation portion which comprises a horizontal driving motor configured to horizontally rotate a solar photovoltaic panel, a horizontal actuator comprising a horizontal rotor coupled with the horizontal driving motor, and a horizontal limit control and position sensing circuit comprising first and second horizontal cut-off switches and first and second horizontal contact switches, the first horizontal cut-off switch and the first horizontal contact switch arranged on a first end of the horizontal rotor, the second horizontal cut-off switch and the second horizontal contact switch arranged on a second end of the horizontal rotor, the horizontal limit control and position sensing circuit configured to sense whether a horizontal moving tab comes into contact with one of the first and second horizontal cut-off switches and the first and second horizontal contact switches as the horizontal moving tab moves along a length of the horizontal rotor, wherein the first and second horizontal contact switches and the first and second horizontal cut-off switches are limits switches;
an altitude adjustment portion which comprises an altitude adjustment driving motor configured to adjust an altitude of the solar photovoltaic panel, an altitude adjustment actuator comprising an altitude adjustment rotor coupled with the altitude adjustment driving motor, and an altitude adjustment limit control and position sensing circuit comprising first and second altitude adjustment cut-off switches and first and second altitude adjustment contact switches, the first altitude adjustment cut-off switch and the first altitude adjustment contact switch arranged on a first end of the altitude adjustment rotor, the second altitude adjustment cut-off switch and the second altitude adjustment contact switch arranged on a second end of the altitude adjustment rotor, the altitude adjustment limit control and position sensing circuit configured to sense whether an altitude adjustment moving tab comes into contact with one of the first and second altitude adjustment cut-off switches and the first and second altitude adjustment contact switches as the altitude adjustment moving tab moves along a length of the altitude adjustment rotor, wherein the first and second altitude adjustment contact switches and the first and second altitude adjustment cut-off switches are limits switches;
a horizontal rotation driving portion which supplies driving power to the horizontal driving motor;
an altitude adjustment driving portion which supplies driving power to the altitude adjustment driving motor; and
a controller configured to remove driving power to the horizontal driving motor when one of the first and second horizontal contact switches senses contact of the horizontal moving tab and to remove driving power to the altitude adjustment driving motor when one of the first and second altitude adjustment contact switches senses contact of the altitude adjustment moving tab.

2. The solar tracker of claim 1, wherein the horizontal rotor is configured to rotate due to forward or backward rotational driving of the horizontal driving motor, and
wherein the first and second horizontal cut-off switches are arranged closer to respective ends of the horizontal rotor than the first and second horizontal contact switches.

3. The solar tracker of claim 1, wherein the altitude adjustment rotor is configured to rotate due to forward or backward rotational driving of the altitude adjustment driving motor, and
wherein the first and second altitude adjustment cut-off switches are arranged closer to respective ends of the altitude adjustment rotor than the first and second altitude adjustment contact switches.

4. The solar tracker of claim 1, wherein the horizontal rotation driving portion comprises a horizontal brake diode used for a brake preventing inertial rotation of the horizontal driving motor, wherein the horizontal brake diode is configured to match voltage levels of both ends of the horizontal driving motor with each other when the horizontal moving tab is sensed at one of the first and second horizontal cut-off switches.

5. The solar tracker of claim 1, wherein the altitude adjustment driving portion comprises an altitude adjustment brake diode used for a brake preventing inertial rotation of the altitude adjustment driving motor, wherein the altitude adjustment brake diode is configured to match voltage levels of both ends of the altitude adjustment driving motor with each other when the altitude adjustment moving tab is sensed at one of the first and second altitude adjustment cut-off switches.

* * * * *